(12) United States Patent
Kurtz et al.

(10) Patent No.: US 9,561,627 B2
(45) Date of Patent: Feb. 7, 2017

(54) METHOD AND DEVICE FOR COMPACTING AND CONSOLIDATING A THICK COMPOSITE PANEL HAVING A THERMOPLASTIC MATRIX

(71) Applicant: DAHER AEROSPACE, Saint Julien de Chedon (FR)

(72) Inventors: Didier Kurtz, Pornic (FR); Julie Vaudour, La Chevroliere (FR)

(73) Assignee: DAHER AEROSPACE, Saint Julien de Chedon (FR)

( * ) Notice: Subject to any disclaimer, the term of this patent is extended or adjusted under 35 U.S.C. 154(b) by 330 days.

(21) Appl. No.: 14/381,443

(22) PCT Filed: Feb. 28, 2013

(86) PCT No.: PCT/EP2013/054105
§ 371 (c)(1),
(2) Date: Aug. 27, 2014

(87) PCT Pub. No.: WO2013/127965
PCT Pub. Date: Sep. 6, 2013

(65) Prior Publication Data
US 2015/0099105 A1    Apr. 9, 2015

(30) Foreign Application Priority Data
Feb. 29, 2012 (FR) ...................... 12 51876

(51) Int. Cl.
*B29C 70/44* (2006.01)
*B64C 1/10* (2006.01)
(Continued)

(52) U.S. Cl.
CPC ........... *B29C 70/44* (2013.01); *B29C 43/3642* (2013.01); *B29C 70/02* (2013.01); *B29C 70/08* (2013.01);
(Continued)

(58) Field of Classification Search
None
See application file for complete search history.

(56) References Cited

U.S. PATENT DOCUMENTS

| 4,948,653 | A | * | 8/1990 | Dinter | ...................... B32B 7/04 |
|---|---|---|---|---|---|
| | | | | | 428/156 |
| 2009/0321978 | A1 | * | 12/2009 | Kurtz | ..................... B29C 33/68 |
| | | | | | 264/101 |

(Continued)

FOREIGN PATENT DOCUMENTS

| EP | 2064050 A1 | 6/2009 |
|---|---|---|
| EP | 2193014 A2 | 6/2010 |

(Continued)

*Primary Examiner* — David Sample
*Assistant Examiner* — Donald M Flores, Jr.
(74) *Attorney, Agent, or Firm* — Im IP Law; C. Andrew Im

(57) ABSTRACT

A device for compacting and consolidating a stack of fibrous plies pre-impregnated with a thermoplastic polymer, configured to be placed in an oven. The device comprises containment blocks, a flexible compacting plate and a vacuum pump. The containment blocks are supported by a board and demarcate the perimeter of the stack. The containment blocks comprise open grooves that open into the perimeter of the stack. The flexible compacting plate has an area equal to that of the stack but is capable of being inserted inside the perimeter demarcated by the containment blocks. The vacuum pump applies a vacuum to the wrapped volume of the stack comprising a plurality of holes in the board that open outside the perimeter of the stack. A method for implementing the device for manufacturing a thick composite panel having a thermoplastic matrix.

11 Claims, 2 Drawing Sheets

(51) Int. Cl.
  *B64C 1/06*   (2006.01)
  *B64C 1/12*   (2006.01)
  *B29C 70/08*  (2006.01)
  *B29C 70/02*  (2006.01)
  *B32B 5/26*   (2006.01)
  *B29C 43/36*  (2006.01)
  *B29C 70/54*  (2006.01)
  *B32B 15/08*  (2006.01)
  *B29C 70/88*  (2006.01)
  *B32B 15/04*  (2006.01)
  *B32B 7/04*   (2006.01)
  *B29K 101/12* (2006.01)

(52) U.S. Cl.
  CPC .............. *B29C 70/548* (2013.01); *B32B 5/26* (2013.01); *B64C 1/06* (2013.01); *B64C 1/061* (2013.01); *B64C 1/064* (2013.01); *B64C 1/065* (2013.01); *B64C 1/066* (2013.01); *B64C 1/068* (2013.01); *B64C 1/10* (2013.01); *B64C 1/12* (2013.01); *B29C 70/885* (2013.01); *B29K 2101/12* (2013.01); *B29K 2313/00* (2013.01); *B32B 7/04* (2013.01); *B32B 15/04* (2013.01); *B32B 15/08* (2013.01); *B32B 2250/20* (2013.01); *B32B 2250/42* (2013.01); *B32B 2250/44* (2013.01); *B32B 2260/023* (2013.01); *B32B 2260/046* (2013.01); *B32B 2262/101* (2013.01); *B32B 2262/103* (2013.01); *B32B 2262/105* (2013.01); *B32B 2262/106* (2013.01); *B32B 2262/108* (2013.01); *B32B 2605/18* (2013.01); *Y02T 50/433* (2013.01); *Y02T 50/46* (2013.01); *Y10T 428/24752* (2015.01)

(56) References Cited

U.S. PATENT DOCUMENTS

2010/0266808 A1   10/2010  Klein et al.
2011/0017386 A1*  1/2011  Bouvet .................. B29C 33/10
                                                      156/228

FOREIGN PATENT DOCUMENTS

JP         4194265 A     7/1992
WO      9725198 A1    7/1997

* cited by examiner

METHOD AND DEVICE FOR COMPACTING AND CONSOLIDATING A THICK COMPOSITE PANEL HAVING A THERMOPLASTIC MATRIX

RELATED APPLICATIONS

This application is a §371 application from PCT/EP2013/054105 filed Feb. 28, 2013, which claims priority from French Patent Application No. 12 51876 filed Feb. 29, 2012, each of which is herein incorporated by reference in its entirety.

TECHNICAL FIELD OF THE INVENTION

The invention relates to a method and a device for compacting and consolidating a thick composite panel having a thermoplastic matrix. The invention is particularly suited to the manufacturing of a thermoplastic panel used for aeronautics applications, particularly for the structure of an aircraft in areas likely to be subjected to impacts, such as the panel known as the windshield front fairing panel located above the cockpit, or also for manufacturing structural parts that are subject to high stress, such as engine struts, without these examples of application being limitative. The invention relates to the manufacturing of both a flat panel and a panel with a curvature.

BACKGROUND OF THE INVENTION

Composites with thermoplastic matrices, particularly composites with continuous fiber reinforcements in the form of carbon fibers in a matrix made of polyetheretherketone or PEEK, are known for their combination of mechanical characteristics, resistance to impacts and fire behavior. For demanding structural applications, such as the previous examples of applications, the reinforcement rate in the composite is greater than 50% and can reach 65%. The term 'thick' means panels with thickness above 20 mm, that is to say panels with over 150 reinforcing plies.

The document EP-B-2 064 050 describes a method and device for manufacturing a composite panel having a thermoplastic matrix with thickness between 2 mm and 20 mm. Like the method described in this document of the prior art, the method according to the invention is a method known as a non-autoclave method, which only uses the application of vacuum to the stack of plies to compact and consolidate it. Thus, the method according to the invention is particularly advantageous for manufacturing a large panel having a matrix made of a polymer with a high melting point such as PEEK.

The method of the prior art has been found to be unsuitable for making a panel intended for a structural aeronautic application with a finished thickness above 10 mm, that is to say said panel comprises a stack of over 70 plies. That is because there is a very significant risk that a panel of that thickness made using the method of the prior art could have a porosity rate incompatible with the intended application, leading to scrap rates that increase the cost of the panel manufacturing.

OBJECT AND SUMMARY OF THE INVENTION

The invention is aimed at remedying the drawbacks of the prior art and therefore relates to a device for compacting and consolidating a stack of fibrous plies pre-impregnated with a thermoplastic polymer, adapted to be placed in an oven, which device comprises:
  a. a laying up board;
  b. blocks, referred to as containment blocks, that are supported by the board and that demarcate the perimeter of the stack, wherein said blocks comprise open grooves that open into the perimeter of the stack;
  c. covering glass fabric on the side of the containment blocks demarcating the perimeter of the stack;
  d. a flexible compacting plate with an area equal to that of the stack, but capable of being inserted inside the perimeter demarcated by the containment blocks;
  e. means to wrap in a sealed manner the stack of plies, the containment blocks and the compacting plate;
  f. means to apply vacuum to the volume wrapped in that manner comprising a plurality of holes in the board, wherein said plurality comprises holes that open outside the perimeter of the stack.

Thus, the device according to the invention makes it possible to compact the stack of plies optimally, by directly draining the gas contained in the stack through its perimeter. That characteristic is obtained by the grooved containment blocks, which cooperate with the flexible compacting plate to firstly control the volume and thickness of the panel during the melting of the polymer that makes up the matrix, and secondly to keep the compacting pressure even on the stack of plies. Perimeter draining is achieved by the cooperation of the grooves made in the blocks and the position of the vacuum holes located outside the perimeter of the stack.

The invention also relates to a method for compacting and consolidating a stack of fibrous plies pre-impregnated with a thermoplastic polymer, using a device according to the invention, which method comprises the steps of:
  i. laying up a stack of pre-impregnated plies on the board;
  ii. surrounding the perimeter of the stack thus created with the containment blocks, wherein the sides of the blocks in contact with the stack are covered with draining fabric;
  iii. placing the compacting plate at the top of the stack;
  iv. covering the compacting plate and containment blocks with draining fabric;
  v. wrapping the whole in a sealed vacuum cover;
  vi. placing the whole in an oven;
  vii. applying a first vacuum corresponding to a first negative pressure value to the volume contained between the vacuum cover and the board;
  viii. raising the temperature of the whole to the melting temperature of the polymer making up the matrix while continuing to apply a vacuum to the volume contained between the vacuum cover and the board;
  ix. applying a second level of vacuum to the volume contained between the vacuum cover and the board, corresponding to a second negative pressure value greater than the first one.

Thus, the method according to the invention applies a vacuum to the stack of plies throughout the heating process, particularly before the thermoplastic polymer melts. In one surprising effect, the vacuum arrangement of the device according to the invention makes it possible to obtain appropriate compacting levels thanks to the effective removal of gas from the stack. Without being bound by this explanation, it is presumed that minor surface condition defects of the pre-impregnated and non-tacky plies suffice to remove gas from the stack by perimeter extraction by means of the grooves made in the containment blocks, till the polymer making up the matrix melts. Perimeter extraction makes it possible to take advantage of that effect for a longer time than with extraction that is essentially carried out through the thickness of the stack as in the method of the prior art. The application of two levels of negative pressure makes it possible to carry out gas removal up to the melting temperature of the thermoplastic polymer making up the matrix, then compact the whole with the compacting plate at the second level of negative pressure, while the resin is at a temperature that is sufficient for impregnating the reinforcing fibers. That compacting plate does not rest on the blocks and is flexible, so it produces even pressure on the stack and avoids localized pressure that could lead to squeezing, corrugations in the plies and compacting defects.

The invention can be implemented advantageously in the embodiments described below, which may be considered individually or in any technically operative combination.

Advantageously, the containment blocks are substantially wedge shaped, with the thickness of a block between its top and its support surface on the board reducing from the side of the block demarcating the perimeter of the stack, forming an inclined face, which inclined face is grooved. That characteristic substantially improves gas removal from the stack through the perimeter and also provides even pressure in the direction perpendicular to the stack of the vacuum cover on the compacting plate.

Advantageously, the support side of the containment blocks on the board is grooved. Thus perimeter extraction is improved in the lower part of the stack, in contact with the board.

Advantageously, the side of the containment blocks demarcating the perimeter of the stack is grooved. Thus, perimeter extraction is improved throughout the thickness of the stack.

Advantageously, the containment blocks are made of steel. Thus, they are sufficiently rigid to contain the volume of the stack when it is compacted and consolidated.

Advantageously, the compacting plate is a titanium sheet with thickness less than or equal to 0.5 mm. Thus, the resistance of the material is suitable for retaining elastic behavior at a temperature corresponding to the melting temperature of the polymer making up the matrix, including at high melting temperatures of about 400° C., while retaining the flexibility required in view of the fine thickness of the plate and the elastic modulus of titanium.

BRIEF DESCRIPTION OF THE DRAWINGS

The invention is described below in its preferred embodiments, which are not limitative in any way, and by reference to FIGS. 1 to 4, wherein.

DETAILED DESCRIPTION OF THE EMBODIMENTS

Figure 1:
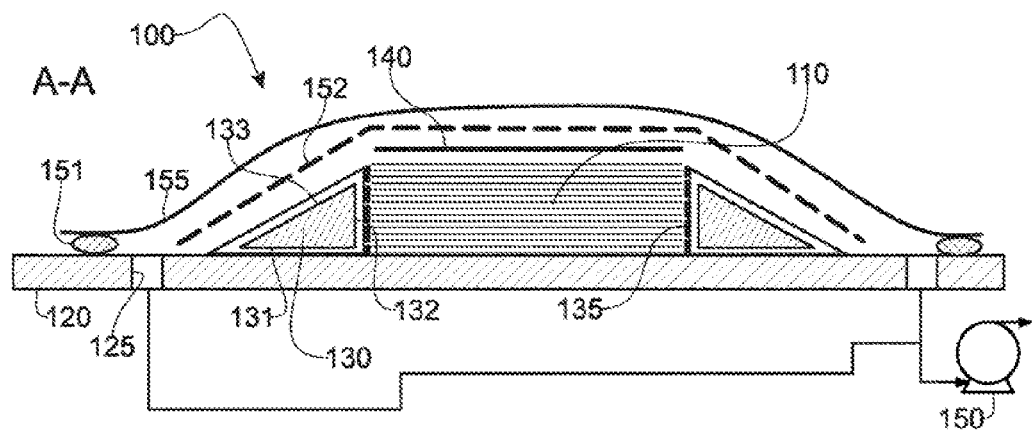
FIG. 1 is a schematic sectional view along the section defined in FIG. 3 of an exemplary embodiment of the device according to the invention.

In FIG. 1 of one exemplary embodiment, the device (100) according to the invention is suitable for compacting and consolidating a stack (110) of fibrous plies pre-impregnated with a thermoplastic polymer. Said fibrous plies are, in one exemplary embodiment, suitable for the manufacturing of panels intended for aeronautics applications, unidirectional plies of carbon fibers calendered with thermoplastic polymer such as PEEK. Alternatively, the device (100) according to the invention is suitable for consolidating plies made up of fabric, powdered with thermoplastic polymer or comprising comingled thermoplastic fibers. The device according to the invention is suitable for compacting and consolidating a stack (110) comprising more than 150 plies, or a panel with a finished thickness above 20 mm for a reinforcement rate of about 65%. The stack (110) is laid up directly on the surface of a board (120) reproducing the shape of the panel to make. Laying up may be manual or automated. The pre-impregnated plies are not tacky and so the stack is stabilized, in one exemplary embodiment, by sticking the first ply to the surface of the board (120) with adhesive tape; the successive plies of the stack are joined to each other and to the first ply by local welds, in the form of welding dots or lines The stack is laid up and then clasped in containment blocks (130) that demarcate the perimeter of said stack (110) and are fixed to the board (120), for example by means of adhesive tape resistant to high temperature or by obstacles in the form of pins. In one exemplary embodiment, said containment blocks (130) are substantially wedge-like in shape, with the highest part placed near the stack (110). Such a containment block (130) advantageously comprises a plurality of open grooves (131, 132, 133) that open out into each other on several sides of said block (130) particularly, on the support side of the block on the board, on the side of the block demarcating the perimeter of the stack and on the upper side with an inclined face of that block. The board (120) and the containment blocks (130) are advantageously made of steel, preferably steel known as tool steel, comprising 0.4% carbon, 2% chrome, manganese and molybdenum, with tensile strength greater than or equal to 1000 M Pa. The sides of the containment blocks (130) demarcating the perimeter of the stack (120) are separated from said stack by draining fabric (135) made up of fine glass fabric. The board (120) has a plurality of extraction holes (125) connected by an appropriate circuit to a vacuum pump (150). These holes (150) all open outside the stack, so that the surface of the board (120) on which the stack is laid up is smooth. A compacting plate (140) is placed at the top of the stack. The dimensions of the compacting plate (140) are such that it covers the stack (110) without resting on the top of the containment blocks (130). The compacting plate is flexible. That combination of characteristics allows it to press evenly on the whole surface of the stack.

Figure 2:
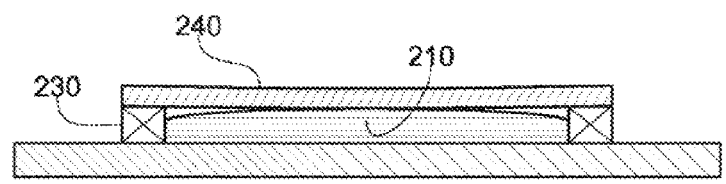
FIG. 2 relating to the prior art is a schematic sectional view of a compacting and consolidating device raised to the melting temperature of the thermoplastic polymer making up the matrix of the composite.

Indeed, FIG. 2 relating to the prior art is an amplified representation of the action of a compacting plate (240) according to the prior art, supported by containment blocks (230) during the consolidation of a stack (210) of plies for making up a composite panel. The applicant has shown that because of the inevitable edge effects, when the thermoplastic polymer making up the matrix is melted, the top of the stack takes a substantially convex shape. The compacting plate (240), which is rigid according to the prior art, is pressed against the containment blocks (230), which are slightly shorter than the final thickness of the part. Thus, the compacting plate, even if it does maintain the volume, does not apply uniform pressure on said stack (210), thus leading to defects. Further, when consolidation takes place at a high temperature, for example 400° C., the mechanical characteristics of the material making the compacting plate drop, so that said plate (240) also tends to be deformed, but concavely, thus amplifying the local support phenomenon.

Returning to FIG. 1, draining fabric (152), for example in the form of coarse glass fabric, is placed above the compacting plate, which fabric (152) extends up to the surface of the board (120). A vacuum cover, or bag (155), associated with sealing means (151), wherein the two (151, 155) are suited to the temperature of use of the device, create a sealed volume, in which the extraction means (125, 151) can create a vacuum.

Figure 3:
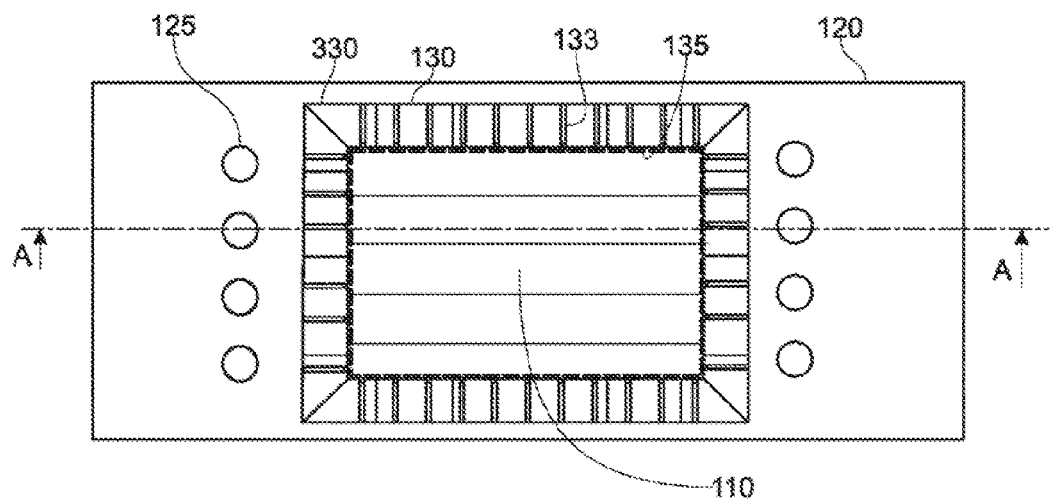
FIG. 3 is a schematic top view of an exemplary embodiment of the device according to the invention.

In a top view of FIG. 3, the containment blocks comprise straight blocks (130) and angle blocks (330), all grooved, so as to surround the perimeter of the stack (110), and the draining fabric (135) in contact with the stack (110) also extends over the whole perimeter.

Figure 4:
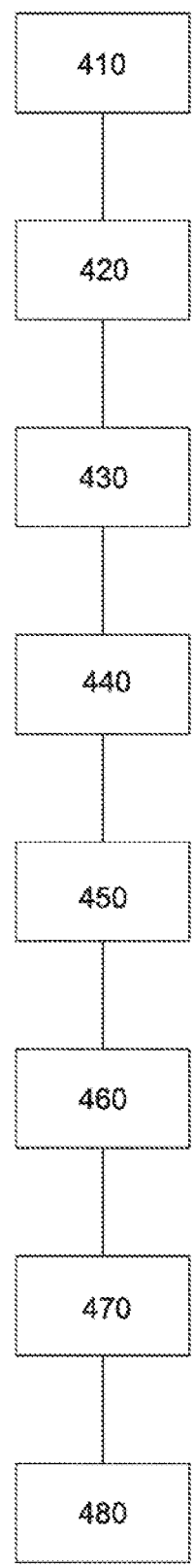
FIG. 4 is a chart of the method according to the invention.

In FIG. 4 of an exemplary embodiment, the method according to the invention comprises a first laying up step (410) consisting in making the stack on the board. The side of the board on which the stack is made is advantageously coated with water-based stripping agent of the type CIREX® SI 041 WB distributed by SICOMIN 31 avenue de la Lardière 13 161 Châteauneuf les Martigues FRANCE. During an installation step (420), the containment blocks and draining fabric are installed along the perimeter of the stack. During a wrapping step (430), the compacting plate, the draining fabric, the vacuum cover and the sealing means are installed; the device is then connected to the vacuum pump. Advantageously, the side of the compacting plate in contact with the stack is also coated with stripping agent of the CIREX® type. During a stoving step (440), the device is placed in an oven. During a gas removal step (450), the temperature of the oven is raised to the melting temperature of the thermoplastic polymer by creating in the compartment demarcated by the vacuum cover a first level of vacuum by lowering the pressure of said compartment to a value between 10 and 100 Pa.

According to a compacting step (460), the oven temperature is raised to a temperature above the melting temperature of the polymer, sufficient to achieve the impregnation of the fiber reinforcements by said polymer, for example, a temperature of 400° C. for PEEK. At the same time, the vacuum in the compartment demarcated by the vacuum cover is pushed to take the pressure in the compartment down to a value between 0.1 and 0.01 Pa. The viscosity of the thermoplastic polymer in the melted state prevents it from going through the draining fabric surrounding the perimeter of the stack, and from being sucked in by the pump. Thus, the effect of increasing the vacuum is mainly to increase the pressure of the compacting plate on the stack, which brings about the compacting of the whole. During a cooling step (470), the heating of the oven is switched off, and the vacuum is maintained till the temperature in the stack reaches the glass transition temperature of the polymer making up the matrix of the composite. Finally, the whole is unmolded during an unmolding step (480). If necessary, the panel formed in this way undergoes finishing operations, particularly trimming, or the addition of stiffeners on its surface by welding.

The description above and the exemplary embodiments show that the invention reaches the objectives sought, particularly by separating the gas removal step (450) and the compacting step (460), by using lateral gas removal and a flexible compacting plate (140); the device and method according to the invention make it possible to make a thick thermoplastic panel, which panel may be used advantageously, particularly as a fuselage panel of an aircraft in an area subjected to impact risks, particularly front windshield fairing of said aircraft, in order to reduce the mass and fuel consumption of the aircraft.

The invention claimed is:

1. A device for compacting and consolidating a stack of fibrous plies pre-impregnated with a thermoplastic polymer, configured to be placed in an oven, comprising:
    a laying up board;
    containment blocks that are supported by the laying up board and that demarcate a perimeter of the stack of fibrous plies, wherein the containment blocks comprise open grooves that open into the perimeter of the stack of fibrous plies;
    a draining fabric on a side of the containment blocks demarcating the perimeter of the stack of fibrous plies;
    a flexible compacting plate with an area equal to that of the stack of fibrous plies and insertable inside the perimeter demarcated by the containment blocks;
    a sealing element for wrapping in a sealed manner the stack of fibrous plies, the containment blocks and the compacting plate to provide a wrapped volume;
    a vacuum pump for applying a vacuum to the wrapped volume comprising a plurality of holes in the board that open outside the perimeter of the stack of fibrous plies.

2. The device according to claim 1, wherein the containment blocks are substantially wedge shaped forming an inclined grooved face, with a thickness of a containment block between its top and its support surface on the board reducing from the side of the containment block demarcating the perimeter of the stack of fibrous plies.

3. The device according to claim 2, further comprising grooves on three sides of the containment blocks that open out into each other.

4. The device according to claim 1, wherein a support side of the containment blocks on the board is grooved.

5. The device according to claim 4, further comprising grooves on three sides of the containment blocks that open out into each other.

6. The device according to claim 1, wherein the side of the containment blocks demarcating the perimeter of the stack is grooved.

7. The device according to claim 6, further comprising grooves on three sides of the containment blocks that open out into each other.

8. The device according to claim 1, wherein the containment blocks are made of steel.

9. The device according to claim 1, wherein the flexible compacting plate is a titanium sheet with thickness less than or equal to 0.5 mm.

10. A method for compacting and consolidating a stack of fibrous plies pre-impregnated with a thermoplastic polymer, comprising the steps of:
    laying up the stack of pre-impregnated plies on a laying up board of a device for compacting and consolidating the stack of fibrous plies;
    surrounding a perimeter of the stack of the fibrous plies with containment blocks of the device that are supported by the laying up board and that demarcate the perimeter of the stack of fibrous plies, wherein the containment blocks comprise open grooves that open into the perimeter of the stack of fibrous plies and
    covering sides of the containment blocks in contact with the stack of fibrous plies are covered with a draining fabric of the device;
    placing a flexible compacting plate of the device at the top of the stack of fibrous plies, the flexible compacting plate having an area equal to that of the stack of fibrous plies and insertable inside the perimeter demarcated by the containment blocks;

covering the compacting plate and the containment blocks with the draining fabric of the device;

wrapping the stack of fibrous plies, the containment blocks and the compacting plate in a sealed vacuum cover with a sealing element of the device to provide a wrapped volume;

placing the wrapped volume in an oven;

applying a first vacuum level corresponding to a first negative pressure value to the wrapped volume contained between the sealed vacuum cover and the laying up board using a vacuum pump of the device, the wrapped volume comprising a plurality of holes in the board that open outside the perimeter of the stack of fibrous plies;

raising a temperature of the wrapped volume to a melting temperature of the thermoplastic polymer making up the matrix while applying the first vacuum level to the wrapped volume contained between the sealed vacuum cover and the laying up board; and applying a second vacuum level to the wrapped volume contained between the sealed vacuum cover and the laying up board, the second vacuum level corresponding to a second negative pressure value greater than the first negative pressure value.

11. The method according to claim 10, wherein the method produces a composite panel of an aircraft, the composite panel having a thermoplastic matrix with thickness greater than 20 mm in a structural area of the aircraft subject to impact risks.

* * * * *